(12) United States Patent
Voelkl et al.

(10) Patent No.: US 11,731,302 B2
(45) Date of Patent: Aug. 22, 2023

(54) WEIGHT VARIATION METHOD AS WELL AS SLICING MACHINE FOR ITS OPERATION

(71) Applicant: TVI ENTWICKLUNG & PRODUKTION GMBH, Bruckmuehl (DE)

(72) Inventors: Thomas Voelkl, Bruckmuehl (DE); Martin Mayr, Eiselfing (DE)

(73) Assignee: TVI ENTWICKLUNG & PRODUKTION GMBH, Bruckmuehl (DE)

( * ) Notice: Subject to any disclaimer, the term of this patent is extended or adjusted under 35 U.S.C. 154(b) by 218 days.

(21) Appl. No.: 17/318,280

(22) Filed: May 12, 2021

(65) Prior Publication Data
US 2021/0354325 A1   Nov. 18, 2021

(30) Foreign Application Priority Data
May 12, 2020   (DE) .......................... 102020112863.0

(51) Int. Cl.
*B26D 5/00*   (2006.01)
*B26D 7/32*   (2006.01)

(52) U.S. Cl.
CPC .............. *B26D 5/005* (2013.01); *B26D 7/32* (2013.01); *B26D 2007/327* (2013.01)

(58) Field of Classification Search
CPC ..... B26D 5/005; B26D 7/32; B26D 2007/327
See application file for complete search history.

(56) References Cited

U.S. PATENT DOCUMENTS

| 4,136,504 A | * | 1/1979 | Wyslotsky | B26D 7/30 83/365 |
| 4,941,375 A | | 7/1990 | Kasper | |
| 5,042,340 A | * | 8/1991 | Kasper | B26D 7/30 83/73 |
| 5,109,936 A | * | 5/1992 | Ruppel | B26D 7/30 177/25.19 |

(Continued)

FOREIGN PATENT DOCUMENTS

| DE | 196 04 254 A1 | 8/1997 |
| DE | 196 07 545 A1 | 9/1997 |

(Continued)

OTHER PUBLICATIONS

German Search Report dated Mar. 22, 2021 (with English Machine Translation), Application No. 10 2020 112 864.9, Applicant TVI Entwicklung und Produktion GmbH, 12 Pages.

(Continued)

*Primary Examiner* — Sean M Michalski
(74) *Attorney, Agent, or Firm* — Brooks Kushman P.C.

(57) ABSTRACT

In order to avoid underweight of slices when slicing a loaf into slices, thickness adjustments specified for slicing are adjusted depending on different pre-known parameters, from loaf to loaf and/or from slice to slice within one and the same loaf, preferably also across the boundary between two loaves optimized as early as possible so that existing weight conditions with regard to actual weight of the slices are maintained, in particular no more underweight slices are produced and/or the minimum average weight of the slices required for the entire batch is maintained.

17 Claims, 9 Drawing Sheets

(56) References Cited

U.S. PATENT DOCUMENTS

| | | | | |
|---|---|---|---|---|
| 5,383,561 | A * | 1/1995 | Tokutu | G01G 15/006 |
| | | | | 177/50 |
| 5,481,466 | A * | 1/1996 | Carey | A22C 17/0086 |
| | | | | 83/37 |
| 5,666,866 | A * | 9/1997 | Huang | B26D 7/30 |
| | | | | 177/253 |
| 6,640,681 | B1 * | 11/2003 | Weber | B26D 7/32 |
| | | | | 83/155.1 |
| 8,869,664 | B2 * | 10/2014 | Eyles | B26D 7/30 |
| | | | | 83/77 |
| 8,892,239 | B2 * | 11/2014 | Weber | B26D 7/0683 |
| | | | | 700/109 |
| 9,296,120 | B2 * | 3/2016 | McLaughlin | B26D 7/30 |
| 9,597,812 | B2 * | 3/2017 | Schmeiser | B26D 7/025 |
| 9,613,412 | B1 * | 4/2017 | Olson | G06F 16/51 |
| 9,764,490 | B2 * | 9/2017 | Weber | B26D 5/20 |
| 10,226,053 | B2 * | 3/2019 | Jacobsen | G06F 17/10 |
| 10,245,745 | B2 * | 4/2019 | Völkl | A22C 17/02 |
| 2005/0199111 | A1 * | 9/2005 | Sandberg | A22C 17/0033 |
| | | | | 83/13 |
| 2008/0190303 | A1 * | 8/2008 | Hiederer | B26D 7/30 |
| | | | | 83/13 |
| 2012/0089244 | A1 | 4/2012 | Weber | |
| 2012/0205164 | A1 | 8/2012 | McLaughlin et al. | |
| 2014/0366696 | A1 * | 12/2014 | Weiss | B26D 7/06 |
| | | | | 83/162 |
| 2015/0040521 | A1 * | 2/2015 | Hubner | B26D 7/18 |
| | | | | 83/42 |
| 2015/0047482 | A1 * | 2/2015 | Stadtmuller | B26D 7/0658 |
| | | | | 83/98 |
| 2015/0216192 | A1 | 8/2015 | Jacobsen et al. | |
| 2015/0224667 | A1 * | 8/2015 | Weber | B26D 7/0683 |
| | | | | 83/23 |
| 2019/0077037 | A1 * | 3/2019 | Svetlik | B26D 7/32 |
| 2019/0281843 | A1 | 9/2019 | Voelkl et al. | |
| 2021/0354327 | A1 | 11/2021 | Mayr et al. | |

FOREIGN PATENT DOCUMENTS

| | | |
|---|---|---|
| DE | 198 20 058 A1 | 12/1999 |
| DE | 199 15 861 A1 | 10/2000 |
| DE | 10 2004 041 915 A1 | 3/2006 |
| DE | 10 2004 058 873 A1 | 8/2006 |
| DE | 196 07 545 B4 | 4/2007 |
| DE | 10 2010 047 623 A1 | 4/2012 |
| DE | 10 2012 107 278 A1 | 2/2014 |
| DE | 10 2015 221 907 A1 | 6/2016 |
| DE | 10 2016 107 849 A1 | 11/2017 |
| DE | 10 2017 105 919 A1 | 9/2018 |
| EP | 2 090 409 A1 | 8/2009 |
| EP | 3 505 879 A1 | 7/2019 |
| WO | 2018/033352 A1 | 2/2018 |

OTHER PUBLICATIONS

Supplemental Preliminary Amendment Filed Jul. 21, 2021, Co-Pending U.S. Appl. No. 17/318,090, 12 Pages.

Substitute Specification—Clean Copy, "Weight variation method and slicing machine for its implementation", Co-Pending U.S. Appl. No. 17/318,090, 25 Pages.

German Search Report dated Mar. 22, 2021, Application No. 10 2020 112 863.0, Applicant TWI Entwicklung und Produktion GmbH, 6 Pages.

U.S. Non-Final Office Action dated May 25, 2022, U.S. Appl. No. 17/318,090, 37 Pages.

European Search Report and Written Opinion dated Oct. 7, 2021 (with English Machine Translation of Written Opinion), Application No. 21173098.1-1016, Applicant TVI Entwicklung und Produktion GmbH, 12 Pages.

European Search Report and Written Opinion dated Oct. 11, 2021 (with English Machine Translation of Written Opinion), Application No. 21171225.2-1016, Applicant TVI Entwicklung und Produktion GmbH, 12 Pages.

U.S Final Office Action dated Nov. 17, 2022, U.S. Appl. No. 17/318,090, 27 Pages.

Amendment Filed Aug. 24, 2022, Co-Pending U.S. Appl. No. 17/318,090, 14 Pages.

U.S Non-Final Office Action dated May 11, 2023, U.S. Appl. No. 17/318,090, 27 Pages.

\* cited by examiner

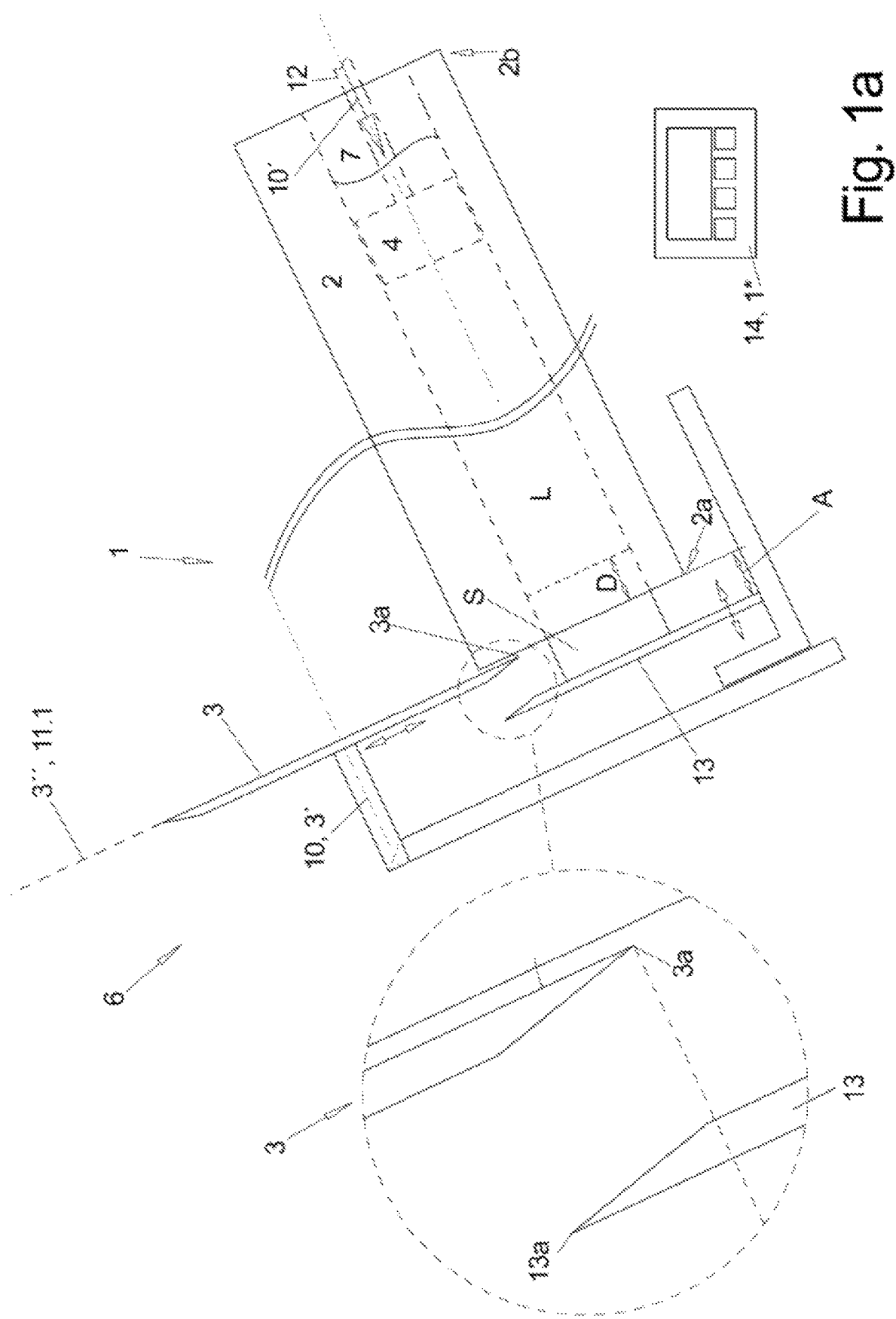

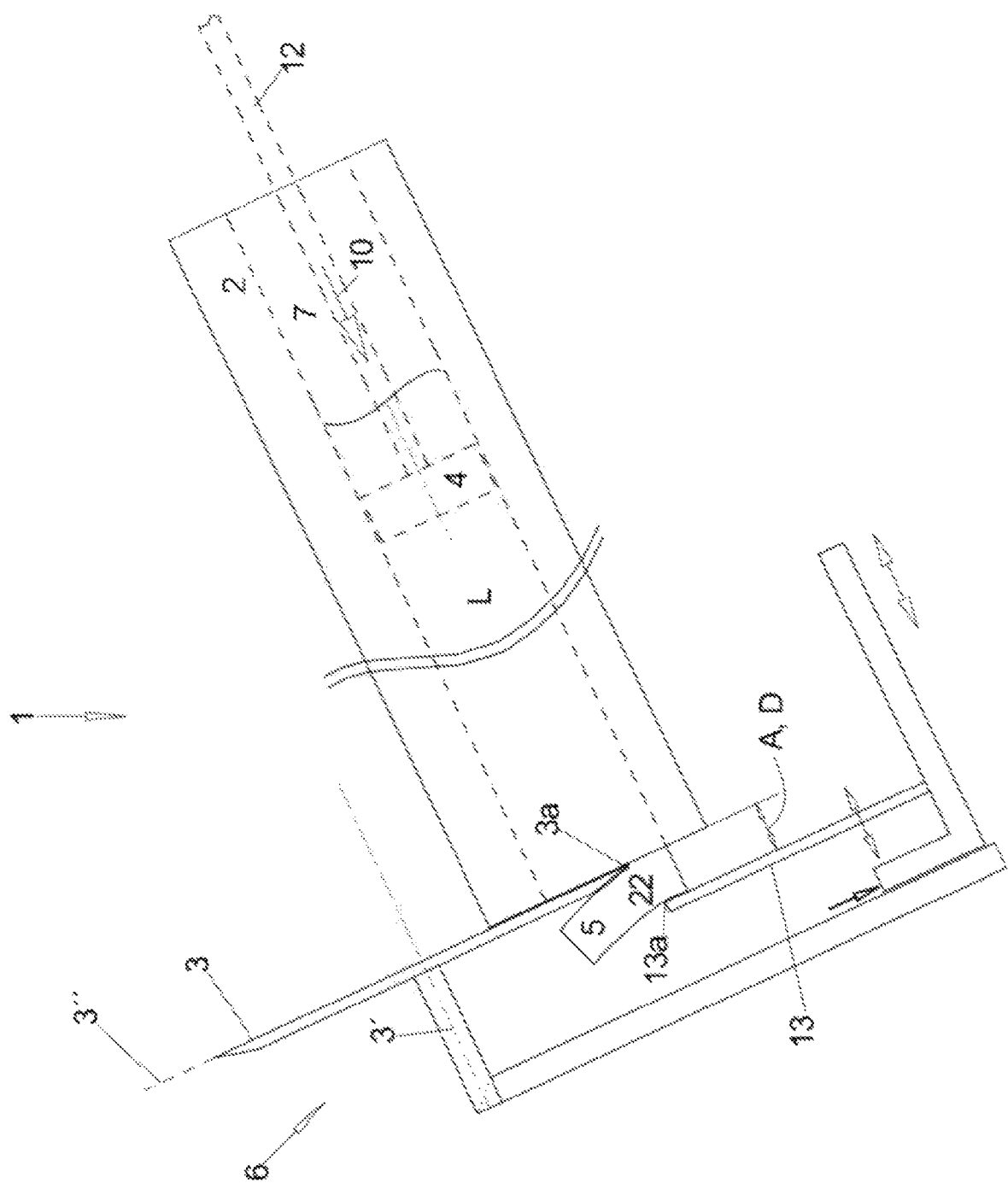

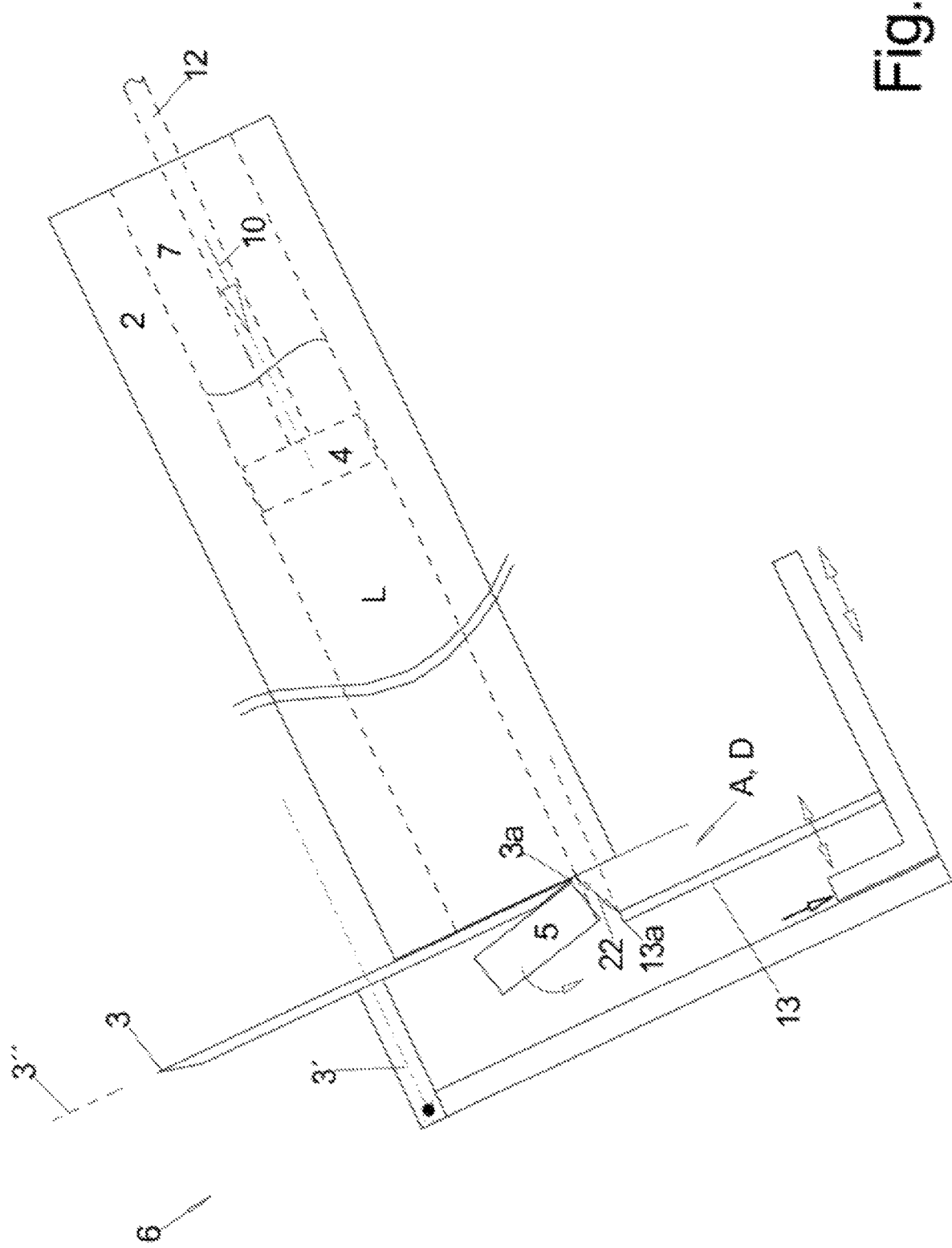

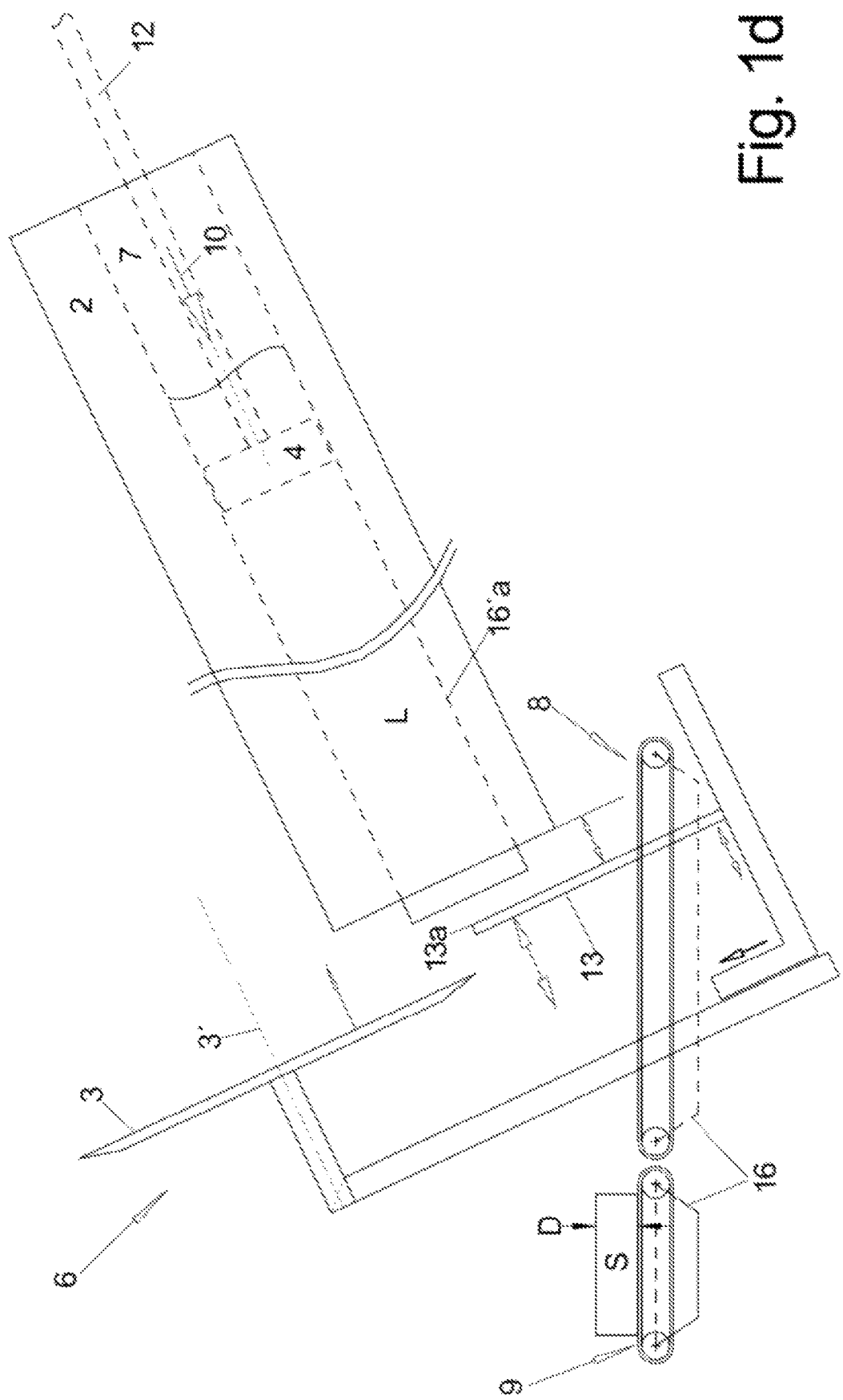

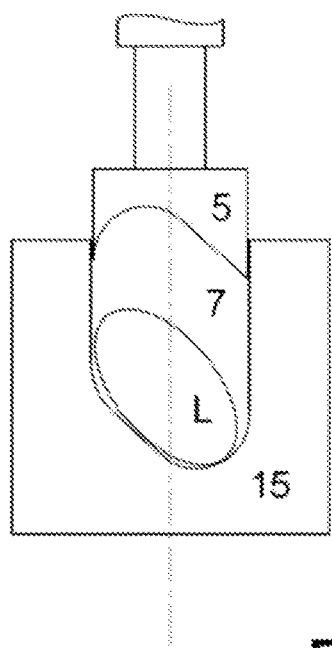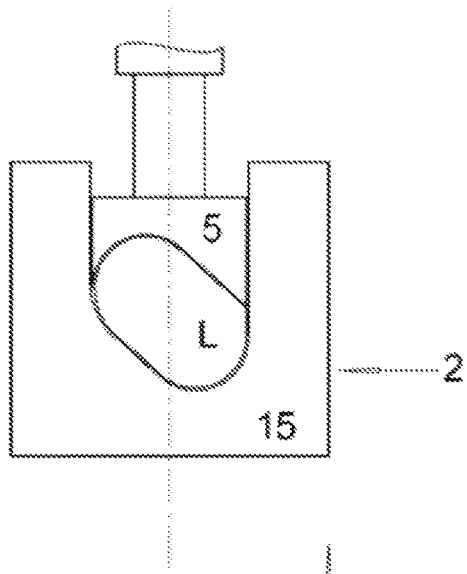
Fig. 2a
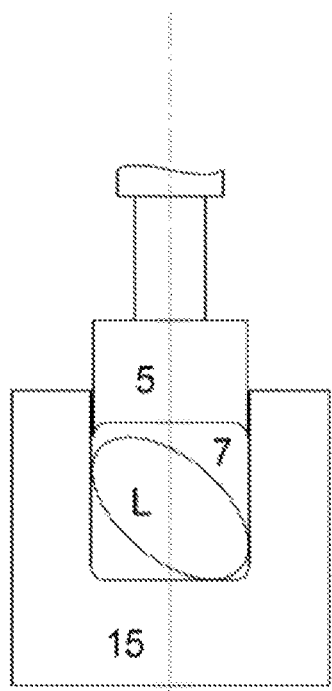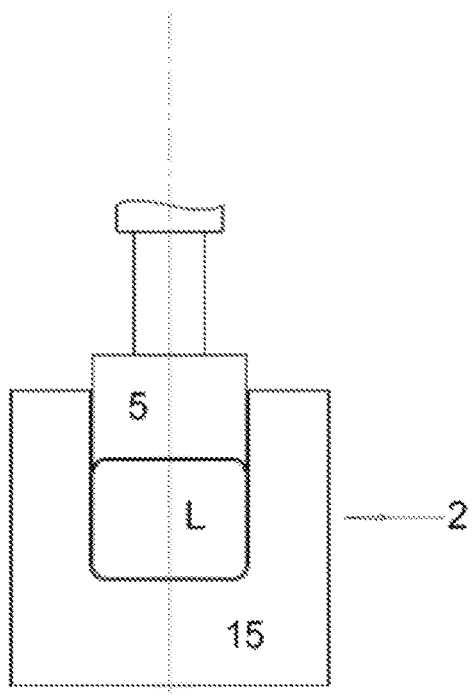
Fig. 2b

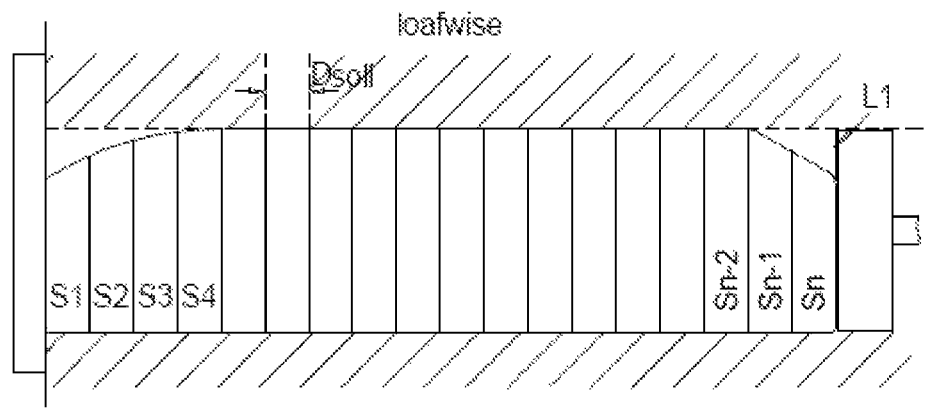
Fig. 3a
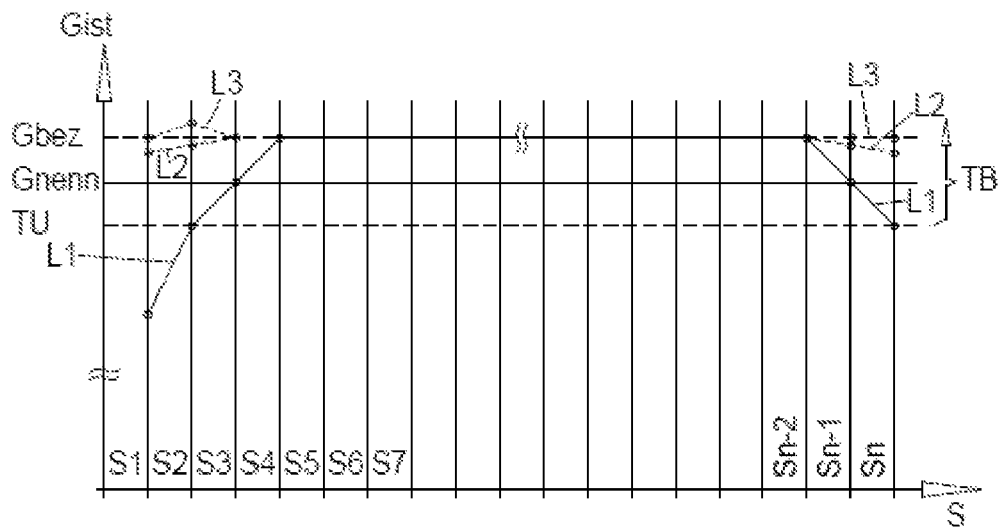
Fig. 3b
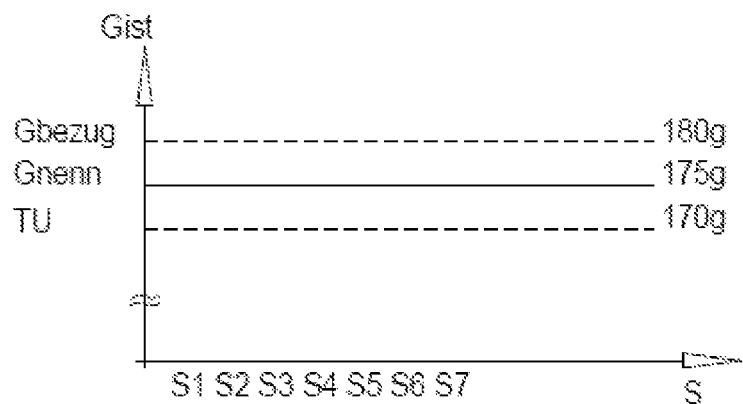
Fig. 3b1

Correction of thickness-adjustment fort the slicers from loaf to loaf

Gnenn=175g, Gbezug=180g, Sequence (f)= 4

| | S1 | S2 | S3 | S4 | | Sn-2 | Sn-1 | Sn |
|---|---|---|---|---|---|---|---|---|
| Gbez | 180 | 180 | 180 | 180 | 180 | 180 | 180 | 180 |
| Gist(L1) = Gistun(L1) | 160 | 170 | 175 | 180 | | | | |
| ΔL1 = ΔL1un | -20 | -10 | -5 | 0 | | 0 | -5 | -10 |
| KL2'= ØΔLun(f) | 20 | 10 | 5 | 0 | | 0 | 5 | 10 |
| Gist(L2) | 178 | 179 | 180 | 180 | | 180 | 179 | 178 |
| ΔL2 | -2 | -1 | 0 | 0 | | 0 | -1 | -2 |
| Gistun(L2) | 158 | 169 | 175 | 180 | | 180 | 174 | 168 |
| ΔL2un | -22 | -11 | -5 | 0 | | 0 | -6 | -12 |
| KL3'= ØΔLun(f) | 21 | 10,5 | 5 | 0 | | 0 | 5,5 | 11 |
| Gist(L3) | 180 | 182 | 180 | 180 | | 180 | 180 | 180 |
| ΔL3 | 0 | +2 | 0 | 0 | | | | |
| Gistun(L3) | 159 | 171,5 | 175 | 180 | | | | |
| ΔL3un | -21 | -8,5 | -5 | 0 | | | | |
| KL4'= ØΔLun(f) | 21 | 10 | 5 | 0 | | | | |
| Gist(L4) | 183 | 181 | 180 | 178 | | | | |
| ΔL4 | +3 | +1 | 0 | -2 | | | | |
| Gistun(L4) | 162 | 171 | 175 | 178 | | | | |
| ΔL4un | -18 | -9 | -5 | -2 | | | | |
| KL5'= ØΔLun(f) | 20 | 10 | 5 | 0,5 | | | | |
| Gist(L5) | 182 | 179 | 179 | 180 | | | | |
| ΔL5 | +2 | -1 | -1 | 0 | | | | |
| Gistun(L5) | 162 | 169 | 174 | 179,5 | | | | |
| ΔL5un | -18 | -11 | -6 | -0,5 | | | | |
| KL6'= ØΔLun(f) | 20 | 10 | 5 | 1 | | | | |
| Gist(L6) | | | | | | | | |
| ΔL6 | | | | | | | | |
| Gistun(L6) | | | | | | | | |
| ΔL6un | | | | | | | | |
| KL7'= ØΔLun(f) | | | | | | | | |
| Gist(L7) | | | | | | | | |
| ΔL7 | | | | | | | | |
| Gistun(L7) | | | | | | | | |
| ΔL7un | | | | | | | | |

Fig. 3c

Correction of thickness-adjustment from slice to slice within a loaf next influenceable slice-setting = next one after (next=+2 bis +5))

Gnenn=175g,    Gbezug=180g,    Gruppe (g) = 3

| | $\Sigma$KSnext(g) | D=Dsoll+ $\Sigma$KSnext'(g) | Gist | $\Delta$S | Gistun = $\Sigma$KSnext(g) | KSnext=-($\Delta$S:3) |
|---|---|---|---|---|---|---|
| S1 | Null | Dsoll → | 171 → | -9 → | 171 | +3 |
| S2 | Null | Dsoll → | 174 → | -6 → | 174 → | +2 |
| S3 | +3 → | D3=Dsoll+3 → | 180 → | 0 → | 177 → | 0 |
| S4 | +3+2 → | D4=Dsoll+5 → | 184 → | +4 → | 179 → | -1 |
| S5 | +3+2+0 → | D5=Dsoll+5 → | 184 → | +4 → | 180 → | -1 |
| S6 | +2+0-1 | D6 → | | | | |
| S7 | 0-1-1 → | D7 → | | | | |
| S8 | -1-1 → | D8 → | | | | |
| Sn-1 | Dn-1 → | | | | | |
| Sn | Dn → | | | | | |

Fig. 5

WEIGHT VARIATION METHOD AS WELL AS SLICING MACHINE FOR ITS OPERATION

CROSS-REFERENCE TO RELATED APPLICATION

This application claims priority to German Patent Application No. DE 102020112863.0 filed on May 12, 2020, the disclosure of which is incorporated in its entirety by reference herein.

TECHNICAL FIELD

The invention relates to improving weight accuracy in the production of slices or portions of several slices which are as accurate as possible in weight by cutting the slices from a usually elongated food loaf, the cross section of which, however, changes to a greater or lesser extent along its length in its original state, in particular a meat loaf made from fresh meat of a beef or pork animal.

BACKGROUND

When producing slices of exact weight and then packing them with nominal weight indicated on the package (="fixed packaging") of
- single slices (single slice portion), any excess weight of each slice is a loss factor for the manufacturer.
- in the case of weight-accurate multi-slice portions, individual slices with underweight on the one hand and overweight on the other can be combined to form a weight-accurate portion with a specified nominal weight, and only the proportionally much lower overweight of the entire multi-slice portion then represents a loss factor.

In order to be able to control the weight of the slices to be cut, the loaf is usually brought to a cross section that is as constant as possible over its length by pressing in the longitudinal direction and, if necessary, also in the transverse direction, usually in a forming tube that is open at the front and back but closed circumferentially.

Then the pressed loaf is pushed forward by means of the longitudinal press die from the opposite open end face, the cutting end, of the forming tube by a defined feed distance, i.e., an overhang, usually until it bears with pressure against a stop plate, and a slice is cut off directly at the front end face of the forming tube by means of a blade. The axial position of the blade relative to the forming tube and its front end face generally always remains unchanged.

It should be made clear that the feed distance automatically set on the machine for each slice, the so-called thickness adjustment, is usually somewhat greater than the set distance between the stop plate and the axial position of the blade, since the piece of the loaf projecting from the front of the forming tube expands laterally and the resulting projection of the advanced loaf from the forming tube becomes shorter. The actual slice thickness possessed by the slice after it is cut off, that is, after it is free to expand, is usually somewhat greater than the set distance and somewhat less than the thickness adjustment.

For the purposes of the present invention, a fixed correlation is assumed between the weight and thickness of both the slice and the loaf as a whole, and thus the weight and thickness of a slice are quasi-synonymous, for example, correction weight and correction thickness are used quasi-synonymously, and are therefore commonly referred to as correction value.

Before a loaf is cut in slices, the total volume and thus the total weight of the loaf pressed therein—with the cutting end closed—is automatically determined approximately by detecting the position of the longitudinal press stamp and, if applicable, the cross press stamp relative to the forming tube—in particular by determining the extension length of the respective stamp from a working cylinder—while a defined force, the measuring force, is applied to the press stamps. The measuring force preferably corresponds to the feed force with which the loaf is later pushed forward step by step out of the forming tube for the cutting of slices by means of the longitudinal press stamp.

From the total volume of the loaf and the cross section of the forming tube in the compressed state, it is possible to automatically calculate the target thickness which all the slices of this loaf would have to have in order to produce—in particular without residues in the form of underweight slices—only slices whose weight corresponds at least to a predetermined target weight, for example the nominal weight indicated on the label of the individual packaged slice or a reference weight which may be somewhat higher than the nominal weight and which the manufacturer of the packs sets himself internally.

However, there are a number of reasons why, despite to adjustment of the longitudinal position of the blade to such a position corresponding to the nominal thickness of a slice of the compressed loaf, the slices nevertheless do not have the target weight, in particular their weight is outside a tolerance range, in particular below a tolerance lower limit of this tolerance range.

Causes of underweight can be:
- the fact that such a loaf retains its initial shape—often a barrel shape with the greatest thickness and largest cross section in its middle area or, conversely, a spindle shape—to a minor extent even in the pressed state, i.e., in the case of a barrel shape, for example, the forming tube cavity is not completely filled in terms of cross section in its end areas, i.e., when the first and last slices are cut off,
- that due to the unequal static friction between the loaf and the forming tube before the start of slicing, the pressed loaf does not completely fill the forming tube cross section with its front end.

In addition, the loaves of a batch—which usually represent the same piece of meat from the point of origin on the live animal—may have a similar shape in terms of quality, but can differ from one another in terms of quantity, so that the processing parameters determined for a first pressed loaf cannot be transferred without further to the other subsequent loaves of the same batch.

Even qualitatively, the individual loaves of the same batch can differ from one another during slicing, for example in terms of specific weight, degree of freezing, water content, especially on the outer surfaces and thus static friction with respect to the forming tube, and other factors.

The operating parameters of the machine used for slicing can also change during the slicing of a batch of loaves, for example due to partial heating and stretching of individual machine parts.

According to the invention, however, the focus is on the production of weight-accurate individual slice portions, i.e., of slices, each of which is at or above, but as close as possible to, the selected reference weight, in particular a reference weight defined internally by the manufacturer of the slices, in particular within an existing tolerance range, at least above a tolerance lower limit, thus avoiding scrap slices.

Often the following external, mostly legal, conditions apply to the sale of portions with an indicated nominal weight, on the basis of which—and not on the basis of the actual weight—the price indicated on the package is determined and often the manufacturer of the packages with the portions in them is also paid.

1st Condition:

The average of the actual weight of all produced portions of a batch with the same specified nominal weight must be above the nominal weight.

In the case of very large batches whose slicing requires more than one working day, this can also additionally apply to the partial batches sliced on each individual working day.

2nd Condition:

The actual weight of each individual portion, i.e., in the case of single slice portions of each individual slice, must be above an external, usually legal tolerance lower limit TU, which is, for example, 15 g below the nominal weight for a nominal weight between 500 g and 1000 g.

If the 2nd condition is violated, the corresponding portion is waste, whereas if the 1st condition is violated, the entire batch produced is scrap.

Optionally specified, manufacturer-internal condition:

As 3rd condition frequently and also according to the invention, the fulfillment of the 1st condition should also be observed for partial batches, in particular within each individual loaf.

The average actual weight of all the slices produced from a single loaf should therefore be above the nominal weight.

According to the invention, the individual loaf does not necessarily have to be cut open without residues, although this would be the ideal case. However, this requires larger tolerance ranges for the weight of the individual slices compared to the variant in which a residual slice is allowed to remain at the end of the loaf that lies outside the tolerance range, and generally also increases the giveaway.

SUMMARY

It is therefore the object according to the invention to provide a method as well as an apparatus for slicing loaves into weight-accurate slices, in which ideally not a single slice has an actual weight outside the tolerance range, in particular below the tolerance lower limit.

This object can be solved when slicing, in particular, compressed, i.e., definedly shaped, loaves—in particular, out of the described circumferentially closed forming tube, which has a constant cross section along its longitudinal extension—by the procedure described below, which presupposes a correspondingly embodied slicing machine with a correspondingly embodied automatic control.

The thickness adjustments for the slices are automatically calculated and specified by the control of the machine in such a way that the weight of the slices complies with the values given into the control system.

Unless otherwise stated, it is assumed in the following that the nominal weight indicated on the subsequent package and not a higher, internally determined, reference weight is selected and entered into the control as the reference weight for slicing.

With regard to the procedure, it must first be determined how many slices with at least reference weight can be obtained from the loaf to be sliced, for which purpose first of all the total weight and/or total volume of the loaf should be determined, whereby because of an assumed always identical specific weight—at least for a batch of meat pieces—each of these two values can be calculated from the respective other value.

For this purpose, the loaf could simply be weighed before slicing and the maximum achievable number of slices with a specific reference weight calculated from this.

However, since such a loaf has an irregular shape in its initial state, and in particular does not have a constant cross section along its main extension direction, it would then additionally be necessary to know the cross section at each point along the loaf and to redetermine and adjust the thickness of each slice leading to the attainment of the reference weight.

To avoid this, the loaf is usually formed in a circumferentially closed forming tube whose forming tube cavity has a constant cross section over its entire length, at least in the longitudinal direction, e.g., by means of a longitudinal press die, in such a way that the loaf fills the inner cross section of the forming tube cavity as completely as possible at every longitudinal position and is formed into a uniform strand, i.e., a caliber, which has the same cross section throughout its length. Knowing the cross-sectional area of the forming tube cavity and thus of the strand, it is then only necessary to determine the thickness of the slice in order to obtain a slice with a given weight, such as the reference weight.

The volume of the entire loaf can also be determined in this way, in that in the deformed state, i.e., when the deformed loaf already fills the cross section of the forming tube cavity over the entire length of the loaf, it is only necessary to determine the length of the loaf deformed into a strand. This can be done easily and automatically by determining the position of the longitudinal press stamp and knowing the position of the opposite stop, which usually lies directly against the cutting end, during longitudinal pressing.

Preferably, the loaf formed into the strand is subjected to a measuring force which is applied, for example, to the longitudinal extrusion punch, whereby this is preferably the same force with which the loaf is later pushed forward by a defined distance beyond the front end of the forming tube during slitting between the cutting of the individual slices and, in particular, pressed against a stop.

The primary aim is to ensure that the individual slices do not become rejects due to underweight on the one hand and have as little excess weight as possible, e.g., compared to the reference weight, on the other hand, in order to keep the so-called giveaway, which is not paid for, as low as possible. Since the loaf does not have to be cut open without rests, an underweight rest slice can remain per loaf, which can then be used in a different way.

However, the first condition, which almost always applies, must be observed: the average weight of all slices, e.g., of a batch of loaves, must also be above an externally specified tolerance lower limit, usually the nominal weight, either by the customer or by law, otherwise the entire batch is scrap.

Thus, the manufacturer will do everything possible to maintain this necessary average weight of all slices, and in parallel try to ensure that as few slices as possible have a weight below the external tolerance lower limit, which would turn the individual slice into scrap.

The possible procedures and also the cutting machine used for this purpose in order to solve the existing object are explained with reference to the following figures.

BRIEF DESCRIPTION OF THE DRAWINGS

Embodiments according to the invention are described in more detail below by way of examples. The figures show:

FIGS. 1a-d: a slicing machine in principle view from the side in different phases of slicing a loaf, FIGS. 2a, b: in cross section two-piece forming tube in different operating conditions, FIG. 3a: a pressed loaf in side view, with the slices to be made from it already sketched in, FIG. 3b: a weight diagram over all slices of different loaves with weight adjustment relative to the reference weight, FIG. 3b1: an enlargement of FIG. 3b, FIG. 3c: a table for the procedure for the weight adjustment of the slices by loaf, as shown graphically in FIG. 3b, FIG. 4a: applying correction values to a loaf with more slices than the previous loaf, FIG. 5: a table on the procedure for adjusting the weight of the slices from slice to slice within the same loaf.

Figure 4A:
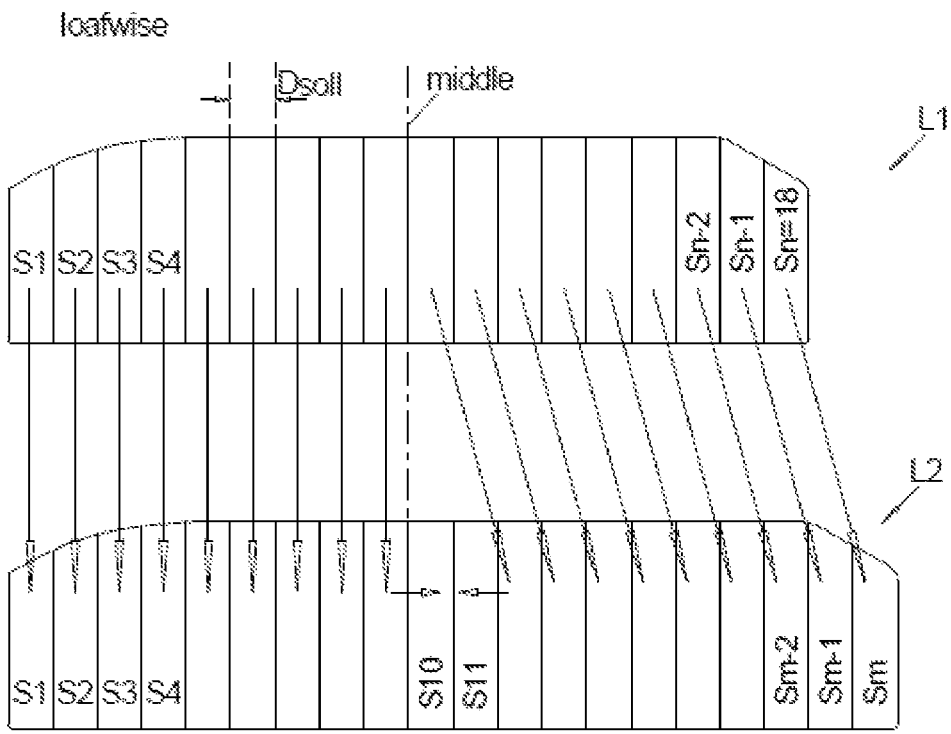
FIG. 4b: applying correction values to a loaf with fewer slices than the previous loaf.

As FIG. 3b1 shows, the manufacturer of so-called fixed packagings is given, on the one hand, the nominal weight Gnenn—which is printed on the packaging and is thus assured to the customer—and, on the other hand, a specified tolerance lower limit TU, as described above, usually the tolerance lower limit for individual slices.

For the control of the thickness adjustments D, the customer can set himself a reference weight Gbezug to be observed, which is, for example, directly the nominal weight Gnenn. However, if the average of the actual weights Gist of all slices S1-Sn of a batch is only slightly below this nominal weight Gnenn, the entire batch of slices produced is waste.

For this reason, a slightly higher weight than the nominal weight Gnenn is often selected as the internally specified reference weight Gbezug in order to minimize this risk, as shown in FIGS. 3b and 3b1.

Loaf by Loaf Correction of Thickness Adjustments According to FIGS. 3a-c:

Since it is assumed that the loaves L1 to Lz of a batch are similar, an attempt is made to correct the actual weights Gist of the individual slices S1 to Sn of the loaf, determined on the basis of a preceding sequence f of loaves of a batch of loaves, from the first S1 to the last slice Sn for the next loaves L2, L3 to be sliced in such a way that, if possible, all slices S1 to Sn of all subsequent loaves L2, L3, etc., comply with the above-mentioned at least two weight conditions, preferably also the third internal condition.

For this purpose, the first loaf L1 of a batch of loaves is cut into slices S1 to Sn with predetermined thickness adjustments, usually the same thickness adjustment Dsoll for all slices S1 to Sn, which should theoretically result in the reference weight Gbezug or nominal weight Gnenn of all slices S1 to Sn. The slices S1 to Sn are weighed individually.

As FIG. 3a in connection with FIG. 1a shows that even a loaf L1 pressed by a longitudinal press stamp 4 against a stop plate 13 does not always fill the cavity of the forming tube 2 as desired, especially at the beginning and end. If all the slices are then cut with the mathematically correct thickness adjustment Dnmn, which theoretically should lead at least to the target weight Gbezug, the first slices S1, S2, S3 and the last slices Sn-1, Sn would still be underweight.

FIG. 3b shows qualitatively the weights of the slices S1 to Sn of different, successive loaves L1 to L3 to be cut, which in this case—even still in the pressed state—have a slight barrel shape, so that primarily the thickness adjustments for the first and last slices of the loaf L should be corrected there:

The basic idea here is that for those slices S1-Sn, i.e., slice numbers S1-Sn, of a loaf which had a differential weight compared with the reference weight Gbezug, loaf correction weights e.g., KL2 and corresponding loaf correction thicknesses e.g., KL2' for the analogous individual slices of the next loaf and to correct the thickness adjustments for the individual slices of the next loaf by these loaf correction thicknesses before slicing it, with the aim that their actual weights Gist then reach or exceed the reference weight Gbezug, namely in the entire loaf.

According to FIG. 3b, the first three slices and the last two slices of the first sliced loaf L1 were still below this reference weight Gbezug, but only the first two and the last slice were below the nominal weight Gnenn, and only the first slice was below the tolerance lower limit TU.

In contrast, all slices of the 2nd loaf L2 as well as the following loaves were already above the nominal weight Gnenn due to the loaf correction values.

As explained above, there is a fixed relationship based on an assumed, known specific weight between a correction thickness KL', and a correction weight KL, which can thus be used synonymously as a correction value.

FIG. 3c shows the concrete procedure for the determination of the loaf correction weights, vertically from top to bottom in the respective column, whereby there is in particular no effect from one slice number to the next within the same loaf.

It is assumed that according to FIG. 3b1 a nominal weight Gnenn of 175 g is to be printed on the single slice portions to be packed individually, which is why the processor has given the control of the machine a reference weight Gbezug of 180 g as a precaution, in order to safely above an external tolerance lower limit TU of 170 g.

Before slicing the 1st loaf L1, the weight determined during pressing of this 1st loaf and the axial length of the 1st loaf L1 were used to determine a thickness adjustment Dsoll(L1) which is the same for the entire loaf L1, i.e., a thickness adjustment for slicing the slices in which the weight of each slice should then mathematically correspond to the reference weight Gbezug.

With this thickness adjustment Dsoll(L1) as the same starting thickness adjustment for all slices, the 1st loaf L1 is cut open and the actual weights Gist(L1) of the individual slices S1 to Sn of the 1st loaf L1 are determined as well as their differential weights ΔL1 to the reference weight Gbezug.

For the subsequent 2nd loaf L2, a loaf correction weight KL2 is determined individually for each slice number S1 to Sn, which corresponds to this differential weight, but with reversed algebraic sign.

Also before slicing the 2nd loaf L2, a thickness adjustment Dsoll(L2), which is the same for the entire loaf L2, is determined from the weight determined during pressing of this 2nd loaf and from the axial length of the 2nd loaf L2. The weight of each slice should then mathematically correspond to the reference weight Gbezug.

This thickness adjustment Dsoll(L2) of the 2nd loaf L2 is now changed for each slice S1 to Sn by a correction thickness KL2' of this slice number corresponding to the loaf correction weight KL2 and the 2nd loaf L2 is cut open with these corrected thickness adjustments D1 to Dn, the slices are weighed and their actual weights Gist(L2) are determined.

The loaf correction weight KL2 for the 2nd, subsequent loaf L2 determined on the basis of the previous, 1st loaf can be converted automatically into a corresponding correction thickness KL2' on the basis of the weight and volume determined during pressing, including the axial length of the new loaf L2, so that it is clear to which weight an axial length unit, for example 1 mm in the longitudinal direction of this new loaf L2, corresponds.

Due to the corrected thickness adjustments, the differential weight ΔL2 between the actual weights Gist(L2) of the 2nd loaf and the reference weight Gbezug is now mostly lower than for the first slices of the 2nd loaf, namely only for the 1st and 2nd slice slightly below the reference weight Gbezug, and both slices are already above the tolerance lower limit TU.

The intention is to correct the thickness adjustments for the next loaf to be sliced, knowing the actual weights of the slices not only of one but of a limited sequence f of preceding loaves, in this case f=4 preceding loaves Lx-4 to Lx-1, before slicing the next loaf Lx.

The loaf correction weight KLx of each slice number, e.g., KLx(S2), should correspond to the average of the differential weights ΔLun(f) of the actual weights Gist of the analogous slices of the preceding loaves Lx-4 to Lx-1 of this sequence f=4 pieces compared to the reference weight Gzug—of course again with reversed sign—which these slices would have had if they had not already been sliced with corrected thickness adjustments, i.e., which they would have had at the calculated thickness adjustment Dsoll of the respective loaf Lx-4 to Lx-1.

Therefore, starting with the 2nd loaf of a batch, the uncorrected actual weights, e.g., Gistun(L2), of each slice are also determined for the sliced slices of a loaf, and from these the uncorrected differential weights, e.g., ΔL2un, whose average over the preceding sequence f results in the loaf correction weight, e.g., KL3, for each slice individually for the subsequent loaf to be sliced, e.g., L3.

The uncorrected actual weight Gistun is determined by subtracting the slice correction weight KLx from the actual weight Gist:

According to FIG. 3c, the 1st slice S1 of the 2nd loaf L2 had an actual weight Gist(L2) of 178 g after a previous correction of the thickness adjustment by, i.e., correspondingly, 20 g upwards. The uncorrected actual weight Gistun (L2) is therefore 178−20=158 g.

The loaf correction weight e.g., KLx is preferably the mean value of the uncorrected differential weights ΔL(x-4) un to ΔL(x-1)un with changed sign accumulated at the sequence f of loaves Lx-4 to Lx-1 preceding this slice at this slice e.g., S1.

Since the actual weight of the 1st sliced loaf L1 was determined with the starting thickness adjustment, i.e., without correction weight, for the 1st loaf L1 the actual weight Gist(L1) of a certain slice, e.g., S1, is at the same time the uncorrected actual weight e.g., Gistun(L1) and the differential weight ΔL1 of each slice is at the same time its uncorrected differential weight ΔL1un.

Since, when determining the loaf correction weights KL3 and loaf correction thicknesses KL3', the preceding sequence of sliced loaves comprised only two loaves and did not reach the upper limit of f=4 set for a sequence f, only the uncorrected differential weights ΔL1un, ΔL2un of the two preceding loaves L1, L2 from the corresponding slices are averaged for the determination of the loaf correction weight KL3' and used with reversed sign as loaf correction weights KL3.

Similarly, to determine the correct loaf correction thicknesses KL4' of a particular slice, e.g., S1, for the 4th loaf the uncorrected differential weights ΔL1un, ΔL2un, ΔL3un of these slices of the 1st to 3rd loaf are averaged, based on the dimensions and weight of this next loaf L4 the loaf correction thicknesses KL4' are calculated from them and the algebraic sign is changed. The calculated thickness adjustment Dsoll(L4) also determined for this next loaf L4 is then again corrected by the corresponding loaf correction thicknesses KL4' slice by slice.

If the procedure is continued in the same way, only the uncorrected differential weights of this slice number of the 2nd to 5th loaf are used to determine the loaf correction weight KL6 or the loaf correction thickness KL6' for the 6th loaf KL6, and only the uncorrected differential weights of the 3rd to 6th loaf are used to determine the loaf correction weight KL7 or the loaf correction thickness KL7' for the 7th loaf KL7, and so on.

Since only a limited number of preceding loaves and their uncorrected actual weights of the slices are thus taken into account, long-term changes during the slicing of a batch of loaves can be taken into account, and even one-off outliers which have occurred in the form of loaves with very high differential weights of the sliced slices are only taken into account over a limited number of subsequent loaves.

This consideration of the actual weights of the analogous slice numbers of preceding loaves takes place over all slice numbers S1 to Sn of a loaf, and in the case of barrel-shaped loaves usually also leads to loaf correction thicknesses KL2', KL3' for the last slices Sn-3 to Sn in the first loaves of a batch.

In the present case, this procedure causes the actual weights Gist of all slices of a loaf to be at or above the tolerance lower limit TU already when slicing the 2nd loaf L2 and to also reach the reference weight Gbezug as of the 3rd loaf L3.

It is possible that a loaf has a spindle shape instead of the barrel shape shown in FIG. 3a, and that as a result in particular the slices at the front and rear ends, when sliced with the mathematically correct thickness adjustment Dsoll, have an actual weight which is above an upper limit TO—selected by the processor himself, for example. Then the resulting loaf correction values of these 1st and last slices would be negative correction values.

In practice, however, it is usually only attempted to avoid underweight, because if the slice is overweight—even if there should be a bindingly specified tolerance upper limit TO—the excess weight is usually cut off manually from the slice before packaging and used elsewhere. These slices usually only add up to the weight of a whole slice when 10 to 20 slices are overweight in this way, so that this economic loss is much less than the repeated loss of whole slices as rejects.

Instead of an identical starting thickness adjustment for slicing all slices of a 1st loaf L1, concrete slice-by-slice thickness adjustments D1 to Dn or slice-by-slice correction thicknesses ΔL1 by which the starting thickness adjustments to be corrected can also be specified for this 1st loaf L1, for example based on empirical values for previous batches.

If the reference weight Gbezug selected is one close to the tolerance lower limit TU or even this itself, the average value from the uncorrected differential weights of the sequence of preceding loaves can be multiplied by a factor which is at least 1.0, but at most 1.5, better at most 1.3, better at most 1.2, for the calculation of the correction weight, in order to ensure that the actual weights Gist of the slices do not exceed the tolerance lower limit TU.

If the reference weight Gzug is the nominal weight Gnenn or a weight closer to the nominal weight than to the tolerance lower limit TU is selected, the average value from the uncorrected difference weights ΔLun of the sequence of preceding loaves can be multiplied by a factor between 0.5 and 2.0 for the calculation of the correction weight to ensure that the tolerance lower limit TU is exceeded by the actual weights.

(Slicing without Rest Pieces)

This change, in particular increase, of the specified thickness adjustments for some slices from one loaf to the next is not critical as long as the total length of the pressed loaf is equal to or greater than the sum of these changed thicknesses over all slices of a loaf, i.e., in particular, without increasing the specified thicknesses, a residual slice would have remained.

If, on the other hand, a loaf is to be sliced without rest, the thickness adjustments specified for slicing the 1st loaf for the individual slices, in particular the calculated thickness adjustment Dsoll which is the same for all slices, have already been set so that no rest slice should remain.

If the preset thickness adjustments of some slices are then increased, the sum of the preset thickness adjustments would exceed the total length of the loaf.

To avoid this, an optional attempt is made to specify a negative loaf correction value for slice numbers for which no positive loaf correction value occurred and was taken into account for the previously sliced loaves, i.e., to reduce the thickness adjustments for these slices so that the sum of the thickness adjustments of all slices again corresponds to the total length of the loaf.

This applies in particular only to those slice numbers which, even taking this negative loaf correction value into account, still lie above the reference weight, i.e., the nominal weight or the tolerance lower limit, in terms of their then probable actual weight.

(Different Number of Slices Per Loaf)

In the previous explanations it was assumed that all pressed loaves have the same cross section. However, since the presence of a cross press stamp, i.e., cross pressing, is generally force-controlled, the individual pressed loaves have different cross sections.

Since the individual loaves also have different weights, the number of slices that can be produced from the various loaves and that have a target weight can also be different, either additionally or instead.

In the case of different cross sections, but in particular the same number of slices of two successive loaves to be sliced, the loaf correction value resulting from a certain slice number of the preceding loaf is optionally applied to the same slice number of the following loaf to be sliced. This is based on the consideration that, due to the qualitatively identical shaping of the loaves, the same deviations will occur in the areas of certain slice numbers despite possibly different sizes of the cross section.

If the number of slices of two successive loaves to be sliced differs according to FIGS. 4a, b, it must be clarified how the loaf correction weights of the slice numbers are assigned from the preceding to the following loaf.

This is done in particular in such a way that up to a middle range of the slice numbers, in particular up to the middle of the slice numbers, of the preceding loaf the resulting loaf correction values are assigned to the same slice number of the following loaf and applied to the latter. In the case of an odd number of slices of the preceding loaf, the same procedure is followed with the middle slice number.

From this range, in particular the middle of the slice numbers of the preceding loaf, the allocation from the preceding to the succeeding loaf is made starting from the last slice number in each case, i.e., the correction value resulting from the last slice of the preceding loaf is applied to the last slice of the succeeding loaf, and the same is done for the penultimate, penultimate-penultimate slice and so on.

This can result in two different situations:

FIG. 4a shows the case where the subsequent loaf has a higher number of slices than the previous one, in which case the subsequent loaf has two slices more.

According to the above procedure, the two middle slice numbers, e.g., S10 and S11 of the following loaf are then no longer assigned a loaf correction value directly from a slice number of the preceding loaf.

Instead, for the outermost of these previously uncorrected loaf numbers, the loaf correction value is taken from the loaf number adjacent to the nearest end of the loaf and advanced towards the middle of the subsequent loaf until all previously uncorrected loaf numbers have been assigned a loaf correction value.

Figure 4B:
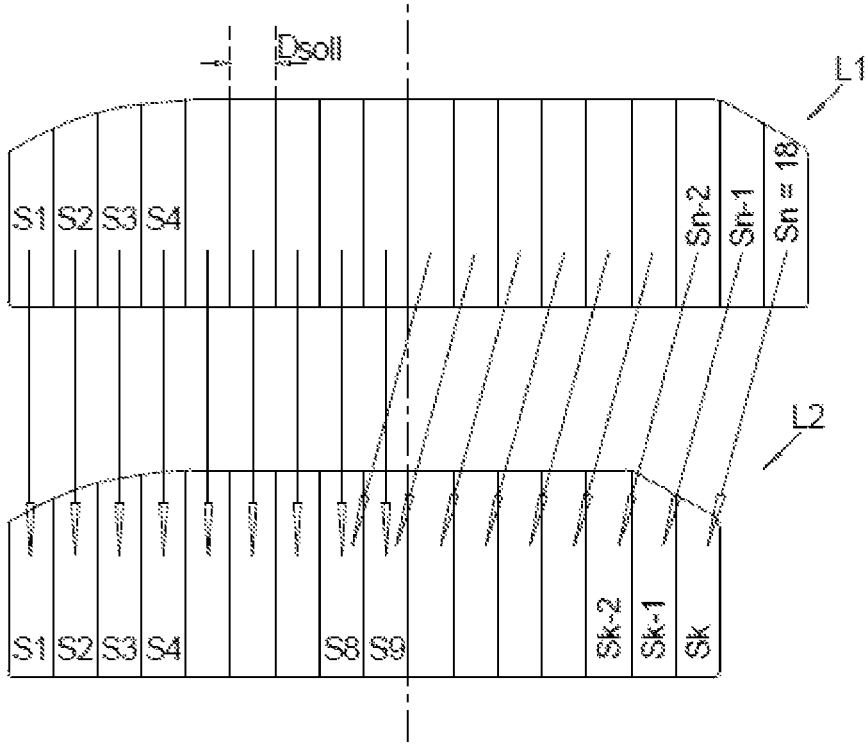

If, according to FIG. 4b, the following loaf has a lower number of slices than the preceding loaf, two loaf correction values each are assigned to slices in the middle area of the following loaf, in this case to slices S8 and S9, from slice numbers of the preceding loaf, according to the number assignment procedure described above.

In this case, the average of the two loaf correction values assigned to the respective slice S8 or S9 is applied to each of these slices, here S8 and S9.

(Corrected L1 Adjustment)

If one wants to avoid that especially at the first loaf L1 of a batch L1 to Lz one slice, in particular one of the first slices S1, S2 . . . and/or one of the last slices Sn-1, Sn is underweight and thus a reject, the specified thickness adjustment D1 to Dn for the individual slices S1-Sn can already be increased for the slicing of the first loaf L1, starting from the calculated nominal thickness Dsoll, by increasing by loaf correction values KL1, which have been determined, for example, from experience in slicing other batches of the same pieces of meat with regard to their position on the animal or are based on other empirical values.

Maintaining the Average Weight Over the Entire Batch:

Optionally, it is also checked whether the average ØΣGist of the actual weights Gist of the slices produced so far from the batch is above the nominal weight Gnenn, and if not, the under weight accumulated so far is determined, in particular by summing up the differential weights of the individual slices so far with respect to the reference weight, in particular the nominal weight Gnenn. Subsequently, measures are taken to compensate for the accumulated under weight by the end of the batch, for which purpose in particular the reference weight Gbezug is changed, in particular increased.

The increase in the reference weight Gbezug can be carried out in such a way that this increase over the number of loaves of this batch still to be sliced at least compensates arithmetically for the shortfall in weight accumulated to date or preferably exceeds it by at least 1%, preferably at least 2%, preferably at least 3%.

At the same time, the accumulated short weight over the remainder of the batch should not be exceeded by more than 6%, preferably not more than 5%, preferably not more than 4% by these measures, i.e., overcompensated, in order to keep the losses for the manufacturer low.

Both measures are preferably checked during slicing of the remaining batch, in particular checked after slicing of each further loaf, and in the event of a negative test result, i.e., if compensation of the accumulated under weight is no longer achieved arithmetically by the end of the batch, the increase in the reference weight Gbezug is again increased or reduced until this is achieved arithmetically.

If the average ⌊ΣGist of the actual weights of all the slices produced so far in this batch is permanently below the reference weight Gbezug, for example even after more than 10, or even after more than 20 loaves, measures must be taken to increase the actual weights of the slices still to be sliced, i.e., of the remaining loaves of the batch, so that the average of all the slices produced from the entire batch is still above the reference weight Gbezug, in particular the nominal weight Gnenn.

For this purpose, for the remaining slices to be sliced, for example, the reference weight Gbezug can be increased or the tolerance lower limit TU can be increased, whereby the increase must be made in such a way, taking into account the remaining loaves still available, that over the expected number of slices still to be produced from this batch, this increase can compensate for, or better overcompensate for, the shortfall in weight accumulated so far, preferably by at least 1%, better by at least 2%, better by at least 3%, but preferably by no more than 6%, better by no more than 5%, better by no more than 4%.

Preferably, during slicing of the remaining loaves, the check is repeated several times, in particular after slicing of each further loaf, whether such compensation can probably be achieved and, if the result of the check is negative, the increase is increased so that compensation can probably be achieved for the remaining loaves to be sliced.

Maintaining Average Weight Even within a Loaf:

Due to the—limited—differences between the individual loaves L1, L2 . . . , conclusions drawn from the actual weights Gist of the slices S1-Sn of a sliced previous loaf Lx-1 can only conditionally effect an optimization when slicing a subsequent loaf Lx, for example because the lower tolerance limit TU for the actual weight Gist of the slices S1-Sn is relatively high, about 94% of the nominal weight Gnenn, and thus the range of variation from loaf to loaf can be higher than this distance.

Instead or in addition to this, in particular for the first loaves of a batch, it makes sense to carry out a correction of the specified thickness adjustments D1, D2, D3 . . . for the separation of slices S1, S2, S3 from one thickness adjustment, e.g., D1, to the next slice that can still be influenced with regard to its thickness adjustment, e.g., D2 or D3, which can still be influenced with regard to their thickness adjustment, within primarily a smaller partial batch, in particular of one and the same loaf Lx, in the sense of avoiding in particular underweight, possibly also overweight, slices or portions, whereby in the following only slices are referred to, but portions can be proceeded with analogously.

By Distributing a Differential Weight Over Several Subsequent Slices, FIG. 5:

This is to be achieved by balancing a differential weight ΔS, i.e., an overweight or underweight, between the uncorrected actual weight Gistun of a slice to the reference weight, in that this differential weight ΔS is apportioned to a group g with a fixed group size of e.g., g=3 subsequent slices with reversed sign and thereby balanced over a limited number of subsequent slices.

Since the actual weight Gist determined from a slice, e.g., S1, and thus also its differential weight can no longer be applied to the immediately next slice, e.g., S2, due to the speed of slicing, but the next slice that can be influenced with regard to the thickness adjustment is usually the next but one slice S3 or even the third closest slice S4, the group consisting of, for example, g=3 slices starts with this next slice that can be influenced.

Thus, if according to FIG. 5 an underweight ΔS of 9 grams has been determined for a 1st slice of a loaf and this is to be distributed over a sequence of g=3 later slices, but the next thickness adjustment which can still be influenced is the one after next, here that of the 3rd slice of this loaf, the previously valid thickness adjustment, e.g., Dsoll, of the 3rd to 5th slice is increased by a slice correction thickness KSnext corresponding to 3 grams in each case.

Almost every slice to be cut (e.g., S7) will have several slice correction thicknesses added or subtracted (e.g., +3+2+ 0), since each slice (e.g., S7_may simultaneously lie in several correction groups g1=S3–S5, g2=S4–S6, g3=S5–S7 triggered by previous, successive, cut and weighed, slices.

In general terms, the procedure is as follows:

the difference weight ΔS of each separated slice (e.g., S3) is determined from its uncorrected actual weight Gistun to the reference weight Gbezug, from this, a slice correction weight KSnext is determined by dividing by a group size g, e.g., g=3, and changing the algebraic sign, for the group g3 of the next slices that can still be reached in terms of thickness adjustment (e.g., S5 to S7), their specified respective thickness adjustments (D5 to D7) are corrected by the slice correction thicknesses KSnext, before each slice (e.g., S5) is cut, all relevant slice correction thicknesses KSnext from the preceding groups (g1, g2 . . . ) concerning this slice (S5) are applied for the correction of the specified thickness adjustment for this slice (e.g., D5).

The 1st slice of a loaf is a special case:

The 1st slice of the 1st loaf of a batch is sliced with a specified thickness adjustment D1, often the thickness adjustment Dsoll calculated from the total weight of the loaf and the desired reference weight.

The predetermined thickness adjustment for the 1st slice S1 of one of the following loaves L2, L3 . . . , on the other hand, is usually already corrected for slice correction thicknesses, as described above, in that the change from the last slice of a loaf to the first slice of the following loaf within a sequence is not taken into account, i.e., the group g also extends across the changeover between two successive loaves.

Generally speaking, also for the first slice or slices of a loaf which is not the first loaf of a batch, the predetermined thickness adjustment of this slice is corrected by all slice correction thicknesses KSnext relevant for this slice from the preceding relevant groups g1, g2 . . . , where the groups g1, g2 . . . can extend across the boundary between two successive loaves L1, L2.

Combination Loaf Correction Values and Slice Correction Values:

Loaf correction values KL and slice correction values KS can also be used in combination with each other:

Since, for most types of loaves L, the differences between the various loaves L1 to Lz of a batch are greater in percentage terms than the differences between two successive slices Snext-1, Snext cut with the nominal thickness Dsoll within a loaf L3, the loaf correction value KL is generally the primary correction value to be taken into account, and the slice correction value KS is the secondary correction value to be taken into account.

If, in particular from the 2nd loaf onwards, a determined non-zero slice correction value with a negative value –KS exists, this should be disregarded if a non-zero loaf correction value with a positive value +KL is determined at the same time for the same slice.

If, on the other hand, a positive slice correction value +KS has also been determined for the same slice S, the higher positive correction value +KL, +KS is to be applied, i.e., either the (positive) loaf correction value +KL or the (positive) slice correction value +KS. The same applies for negative correction values in each case.

With regard to the slicing machine 1 shown in rudimentary form in FIGS. 1a to 1d for cutting slices S from loaves L one after the other, in particular using the method described, such a slicing machine 1 comprises, on the one hand, a holding device 2 for the loaf L to be sliced.

The holding device 2 is a forming tube 2 which is circumferentially closed and open at the end faces, with a cross section of its internal space 7 which remains constant over its entire length.

Furthermore, the slicing machine 1 comprises a cutting unit 6, in which in particular a circular disc-shaped or sickle-shaped blade 3 rotating about a blade axis 3' cuts off from the front end of the loaf L a slice S projecting from the cutting end 2a of the forming tube 2, as well as a control 1* which controls all moving parts of the slicing machine 1.

According to the invention, the control 1* is designed to be able to perform the slicing machine 1 according to the described method for varying the weight of the slices S.

Preferably, in addition to the forming tube 2, the slicing machine 1 comprises a longitudinal press stamp 4, which can be moved from the rear open end, the loading end 2b, into the internal space 7 thereof with a precise fit and is attached to the front end of a piston rod 12, for pressing the loaf L in the longitudinal direction 10 until the latter fills the internal space 7 remaining in front of the longitudinal press stamp 4 as completely as possible and has a cross section which is also uniform over its entire length and corresponds to the cross section of the internal space 7.

Furthermore, there is usually a stop plate 13 for the loaf L pushed forward out of the forming tube 2 by means of the longitudinal press stamp 4, the distance A of which to the front end, the cutting end 2a of the forming tube 2, can be adjusted.

The stop plate 13, when fully approached to the front end face of the forming tube 2, can also serve as a front stop during longitudinal pressing of the loaf L in the forming tube 2 by the longitudinal press stamp 4.

The blade 3, on the other hand, is usually moved back and forth at a longitudinal position that is always the same, in particular relative to the forming tube 2, in particular directly at the front end face of the forming tube 2, for example in a 1st transverse direction 11.1, and thereby in each case cuts a slice S from the loaf L that has in the meantime been advanced again to the stop plate 13.

As can be seen from the sequence of FIGS. 1a to 1d, prior to contact of the loaf L by the cutting edge 3a of the blade 3, the cover plate 13—viewed in longitudinal direction 10—covers the entire cross section of the forming tube 2 and, as the cutting edge 3a of the blade 3 increasingly plunges into the loaf L, moves together with the latter e.g., in this first transverse direction 11.1, so that the slice S pushing through the gap 17 between the cutting edge 3a and the functional edge 13a of the stop plate 13 can finally tip down over this upper edge 13a—which may or may not be beveled—of the stop plate 13 and fall onto the conveyor 8, as can be seen in FIGS. 1b and 1c.

Subsequently, the blade 3 and stop plate 13 move back against the direction of immersion, i.e., in the transverse direction 11.1, as shown in FIG. 1d, and the loaf L is again pushed beyond the front cutting end 2a of the forming tube 2 until it comes to rest against the stop plate 13, which is adjusted to the desired distance A, in particular the thickness adjustment D, again covering the entire cross section of the inner forming cavity 7 as viewed in the longitudinal direction 10.

As best shown by the enlargement of FIG. 1a, when viewed in longitudinal direction 10, stop plate 13 and blade 3 can overlap slightly when viewed in side view transversely to the plunging direction 11.1, if it is ensured by appropriate chamfers at the edge regions facing each other that the gap 17 remaining between them is large enough for the cut-off slice S to move through the gap 17.

A slicing machine 1 of this type also has a scale 16—see FIG. 1d—which determines the actual weight Gist of each sliced slice S individually, and an operating unit 14—see FIG. 1a—with which, in particular, on the one hand the feed distance by which the longitudinal press stamp 4 pushes the loaf L forwards can be set before the next slice is sliced off. On the other hand, based on this, the distance A of the stop plate 13 to the axial position at which the blade 3 is located when a slice S is cut off can also be set, manually and in particular automatically by the control 1*.

The thickness adjustment D to be determined before a slice S is cut off is this feed distance, the feed distance being in all cases not only as large but somewhat larger than the set distance A, but both parameters influencing the subsequent weight Gist of the cut-off slice S.

However, the scale 16 is usually not located under the conveyor 8 onto which the separated slice S falls directly, since exact weight determination is very difficult due to the vibrations caused by the impact of the fallen slice, but as a rule only under the further conveyor 9 immediately following it.

If technically possible, however, weighing should be carried out as far upstream as possible and immediately after the slice S has been cut off, i.e., in particular immediately after it has hit the conveyor 8, because the weight Gist of the slice which has just been cut off should be known as early as possible in order to be able to influence the thickness adjustments D of slice S to be cut subsequently as quickly as possible as a function of this.

The loaf L can be pressed not only in the longitudinal direction 10 by a longitudinal press stamp 4, but also—preferably before or at the same time—by a cross press stamp 5 in one of the transverse directions, preferably also the first transverse direction 11.1, in which the blade 3 moves during cutting.

Corresponding formations of forming tubes 2—viewed in the longitudinal direction 10—are shown in FIGS. 2a, b.

Here, the forming tube 2 viewed in longitudinal direction 10 consists in circumferential direction of two components, namely a transverse press rim 15 which is U-shaped in this viewing direction and into the open side of which a transverse press stamp 5 is inserted in a transverse direction, preferably the first transverse direction 11.1, and presses the previously inserted loaf L, which has an approximately elliptical cross section in the unpressed initial state, in this transverse direction 11.1 until it at least partially assumes a cross section corresponding to the cross section 7' of the remaining internal space 7 in the forming tube 2.

The cross press stamp 5 can thereby be advanced to a fixed transverse position, so that the cross section 7' of the internal space 7 in the forming tube 2 then corresponds to the front surface 4a of the longitudinal press stamp 4, which can then have a shape and size that cannot be changed.

Preferably, however, the cross press stamp 5 is force-controlled so that its final pressing position is not fixed. In this case, the longitudinal press stamp 4 must have a variable cross section in the direction of movement of the cross press stamp 5, which automatically adapts to the cross section 7' of the momentary inner space 7 of the forming tube 2.

Whereas in FIG. 2b the internal space 7 of the transverse press trough 15 has a cross section 7' which is approximately rectangular in shape with rounded edges, in FIG. 2a the internal space 7 has a cross section 7' which has a bottom which is strongly rounded and sloping with respect to the side wall 15a of the transverse press trough 15, which reaches down lower, while the front surface of the cross press stamp 5 has an analogously opposing contour, so that this results in an oblique, approximately parallelogram-shaped or slot-shaped inner cross section 7' with rounded edges in the closed forming tube 2.

Such a cross section 7' of the internal space 7 comes closer to the usually elliptical initial cross section of the loaf L than a rectangular cross section and requires less transverse compression than in the case of the cross section shape 7' according to FIG. 2b, in which the width of the internal free space 7 is usually selected to be smaller than the greatest extent of the approximately elliptical cross section of the unpressed loaf L.

The control 1\* is signally connected to the scale 16, to the operating unit 14 and likewise to the drives of all the pressing punches 4, 5 present and to the drives for the cutting unit 6, in particular of the blade, 3, so that all the movements of the slicing machine 1 can be controlled automatically by the control 1\*.

REFERENCE LIST

- 1 cutting machine
- 1\* control
- 2 forming tube
- 2a cutting end
- 2b loading end
- 3 blade
- 3' blade axis
- 3" blade plane
- 3a cutting edge
- 4 longitudinal press stamp
- 5 cross press stamp
- 6 cutting unit
- 7 forming tube cavity, internal space
- 7' cross section
- 8 conveyor
- 9 conveyor
- 10 longitudinal direction, axial direction, feed direction
- 11 transverse direction
- 11.1 first transverse direction
- 11.2 second transverse direction
- 12 piston rod
- 13 stop plate
- 14 operating unit
- 15 transverse press rim
- 15a, b side wall
- 16 scale
- A distance
- D, D1-Dn (calculated) thickness adjustment of the individual slices
- Dsoll calculated thickness adjustment
- Dist actual thickness
- d slice thickness
- f sequence
- g group
- k, k1, k2 correction factor
- Gbezug reference weight
- Gist actual weight
- Gistun uncorrected actual weight
- Gsoll target weight
- Gsollun uncorrected target weight
- Gnenn nominal weight
- KL, KL1, KL2 loaf correction weight
- KL', KL1', KL2' loaf correction thickness
- KS, KS1, KS2 slice correction weight
- KS', KS1', KS2' slice correction thickness
- L1 to Lz loaf
- TB tolerance range
- TU tolerance lower limit
- TO tolerance upper limit
- ΔL differential weight
- ΔLun uncorrected differential weight
- e.g. ΔL2(S1) e.g. differential weight of slice S1 in loaf L2
- S1 to Sn slice

The invention claimed is:

1. A method for at least achieving a reference weight of as many individual slices (S1 to Sn) as possible when cutting a batch of loaves into slices, by automatically varying thickness adjustments for the slices to be cut, wherein
    A) each loaf is arranged in a holding device for holding the loaf and advancing the loaf during slicing in a feed direction,
    B) weight or volume of a respective loaf is determined,
    C) in each case maximum number of such slices with reference weight which can be produced from this loaf is calculated therefrom,
    D) a thickness adjustment is calculated for all slices of this loaf, at which actual weight of each slice should mathematically correspond at least to the reference weight, and
    E) the actual weight of each separated slice of the loaves of the batch is determined,
    wherein
    F) before slicing a new loaf, in each case for those slice numbers for which, in a preceding loaf of a sequence of loaves, the uncorrected actual weight is increased by an uncorrected difference weight from the reference weight, for each slice number of the new loaf a slice correction weight is determined as a function of the uncorrected difference weights of these slice numbers in the sequence of preceding loaves,
    G) the thickness adjustments for the slice numbers of this new loaf are corrected with respect to the calculated thickness adjustment of this loaf by such slice-by-slice loaf correction thicknesses which correspond to the respective slice-by-slice loaf correction weight,
    H) the new loaf is cut into slices with the thickness adjustments thus corrected for the individual slice numbers.

2. The method according to claim 1, wherein
    in step A) each loaf is received under a measuring pressure in a circumferentially closed forming tube as the holding device with a cross section of a cavity of the forming tube which is constant over an entire length,
    in step B), the weight or volume of the respective loaf arranged therein is determined from a determined length and cross section of that part of the forming tube cavity which, in particular, is under the measuring pressure.

3. The method according to claim 1, wherein the uncorrected actual weight of a slice is determined from the sum of the loaf correction weight and the difference weight between the reference weight and the actual weight of this slice.

4. The method according to claim 1,
wherein
the loaf correction weights for the slice numbers of the new loaf are determined as an average of the uncorrected differential weights of these slice numbers in the sequence of the preceding loaves.

5. The method according to claim 1,
wherein
in case of a 1st loaf, as predetermined thickness adjustments for the individual slices of this first loaf, an identical predetermined nominal thickness adjustment is selected for all slices of this loaf,
and/or
the sequence of considered preceding loaves is at most 10 loaves.

6. The method according to claim 1,
wherein
before slicing a 1st loaf of a batch of loaves,
for predetermined thickness adjustments for the individual slices of this first loaf, experience values from determined thickness adjustments of previous batches are taken into account,
in particular the uniform thickness adjustment of all slices for individual slice numbers, which corresponds by calculation to a desired reference weight, is increased by loaf correction weights determined in each case from experience values with preceding batches or by their percentage value relative to the corresponding uniform thickness adjustment by calculation.

7. The method according to claim 1,
wherein the reference weight lies within a tolerance range with a tolerance lower limit,
wherein
the tolerance lower limit of the tolerance range is selected as the reference weight,
in particular for the calculation of the loaf correction value the average of the uncorrected difference weights of this slice number is multiplied by a factor of maximum 1.5.

8. The method according to claim 1,
wherein
as reference weight a weight is selected which is a nominal weight or lies up to a maximum of 10% above it, and
in particular, for the calculation of the loaf correction value, the average of the uncorrected differential weights of this slice number is multiplied by a factor between 0.5 and 2.0.

9. The method according to claim 1,
wherein the pressed loaves of a batch have a different number of obtainable slices having the reference weight,
wherein
the loaf correction values determined from the actual weights of the preceding loaf,
for the slice numbers of the preceding loaf up to the middle of the slice numbers are applied to the corresponding slice numbers of the loaf to be sliced,
for the slice numbers of the previous loaf from the middle of the slice numbers are applied to the corresponding last slice numbers of the loaf to be sliced.

10. The method according to claim 9,
wherein
in the case of a loaf to be sliced which gives a greater number of slices than the number of slices of the preceding loaf, the surplus middle slice numbers of the loaf to be sliced, compared with the preceding loaf, are assigned the correction value of the slice numbers adjacent to the nearest end of the loaf,
or
in the case of a loaf to be sliced which results in a lower number of slices than the number of slices of the preceding loaf, the mean slice numbers of the loaf to be sliced which fall into both number halves of the preceding loaf compared with the preceding loaf are each assigned averaged loaf correction values from the corresponding correction values of the mean slice numbers of the preceding loaf.

11. The method according to claim 1,
in which a predetermined nominal weight is to be achieved on average over the batch of loaves,
wherein
the average weight is determined from the actual weights of all the slices already produced in a batch and, if this is below the previous reference weight, in particular the nominal weight, measures are taken to increase the average weight of the slices still to be sliced for the loaves still to be sliced,
in particular by increasing the previous reference weight to an increased reference weight for the remainder of the batch.

12. The method according to claim 11,
wherein
the increase in the previous reference weight is selected in such a way that this increase over the number of loaves of this batch still to be sliced off compensates for or exceeds the previously accumulated shortfall weight by at least 1%,
the verification of whether this condition is expected to be met arithmetically is checked several times during the slicing of the remaining loaves, in particular after the slicing of each further loaf, and if the result of the verification is negative, the increase in the previous reference weight is increased so that the required average weight of the slices over the entire batch is expected to be met arithmetically by the end of the batch.

13. The method according to claim 11,
wherein
the increase of the previous reference weight is chosen in such a way that this increase over the number of loaves of this batch still to be sliced exceeds the previously accumulated shortfall weight, but by no more than 6%,
the verification of whether this condition is expected to be met arithmetically is carried out several times during the slicing of the remaining loaves, in particular after the slicing of each further loaf, and if the result of the verification is negative, the increase in the reference weight so far is reduced so that the required average weight of the batch is expected to be met arithmetically by the end of the batch.

14. A method for at least achieving a reference weight of as many individual slices as possible when slicing a batch of loaves into slices by automatically varying thickness adjustments for the slices to be cut
wherein
a) each loaf is arranged under a measuring pressure in a holding device for holding the loaf and advancing the loaf during slicing in a feed direction in particular in a circumferentially closed forming tube with a cross section of a cavity of the forming tube which is constant over an entire length,
b) weight or volume of a respective loaf is determined in particular from a determined axial length as well as cross section of a part of the forming tube cavity which is under the measuring pressure
c) number of such slices with reference weight which can be produced from this loaf in each case is calculated therefrom,
d) predetermined thickness adjustments for the individual slices of this loaf are calculated, in which actual weight of each slice should correspond to the reference weight, and
e) the actual weight of each separated slice of the loaves of the batch is determined, wherein before a new slice is cut, its predetermined thickness adjustment is corrected by a sum of a slice correction thicknesses determined for a group of preceding slices which is fixed in terms of number, wherein the slice correction thickness of a slice corresponds to the difference between the uncorrected actual weight of this slice to the reference weight divided by number of members of the group and changed algebraic sign, in particular, the difference is multiplied by a correction factor.

15. The method according to claim 14, wherein in transition from one loaf to a next loaf, a 1st slice of the next loaf is treated as a next slice following a last slice of the preceding loaf, ignoring the transition.

16. The method of claim 14, wherein the uncorrected actual weight is the actual weight adjusted for both loaf correction weights and slice correction weights.

17. A slicing machine for slicing loaves into slices having an actual weight of as many individual slices as possible within a tolerance range by varying thickness adjustment, comprising a holding device for holding the loaf to be sliced, a cutting unit for cutting slices from the loaf to be sliced, the cutting unit being controllable with respect to the thickness adjustment for parameters influencing the slice to be cut off, a scale for automatic weighing of all slices or portions to be sliced off, a control which controls all movable components of the device, wherein the control is embodied to perform the method according to claim 1.

* * * * *